United States Patent
Pertsel et al.

(10) Patent No.: US 12,445,725 B1
(45) Date of Patent: Oct. 14, 2025

(54) IMAGE STABILIZATION FOR A MULTI-SENSOR CAMERA

(71) Applicant: Ambarella International LP, Santa Clara, CA (US)

(72) Inventors: Shimon Pertsel, Mountain View, CA (US); Moshe Doron, San Francisco, CA (US); Didier LeGall, Los Altos, CA (US)

(73) Assignee: Ambarella International LP, Santa Clara, CA (US)

( * ) Notice: Subject to any disclaimer, the term of this patent is extended or adjusted under 35 U.S.C. 154(b) by 401 days.

(21) Appl. No.: 17/495,858

(22) Filed: Oct. 7, 2021

Related U.S. Application Data

(60) Continuation of application No. 15/978,708, filed on May 14, 2018, now abandoned, which is a division of application No. 15/070,281, filed on Mar. 15, 2016, now abandoned.

(51) Int. Cl.

| | |
|---|---|
| *H04N 5/265* | (2006.01) |
| *H04N 5/91* | (2006.01) |
| *H04N 23/45* | (2023.01) |
| *H04N 23/68* | (2023.01) |

(52) U.S. Cl.
CPC ........... *H04N 23/683* (2023.01); *H04N 5/265* (2013.01); *H04N 5/91* (2013.01); *H04N 23/45* (2023.01)

(58) Field of Classification Search
CPC .. H04N 5/23267; H04N 5/2258; H04N 5/265; H04N 5/91

USPC .......................................................... 386/278
See application file for complete search history.

(56) References Cited

U.S. PATENT DOCUMENTS

| | | | |
|---|---|---|---|
| 10,110,813 B1* | 10/2018 | Doron | H04N 23/698 |
| 10,601,889 B1* | 3/2020 | Doron | H04L 65/65 |
| 10,666,941 B1* | 5/2020 | Doron | H04N 21/21805 |
| 11,089,280 B2* | 8/2021 | Castleman | H04N 13/383 |
| 11,341,614 B1* | 5/2022 | Chen | G06T 7/73 |
| 11,715,180 B1* | 8/2023 | Chen | G06T 7/73 382/106 |
| 2005/0276604 A1* | 12/2005 | Morrow | H04J 14/0241 398/73 |
| 2006/0020213 A1* | 1/2006 | Whitman | A61B 1/05 600/478 |
| 2015/0163408 A1* | 6/2015 | Laroia | H04N 13/232 348/208.1 |
| 2016/0005435 A1* | 1/2016 | Campbell | H04N 9/8211 386/240 |
| 2016/0088287 A1* | 3/2016 | Sadi | H04N 13/194 348/43 |

(Continued)

Primary Examiner — Helen Shibru
(74) Attorney, Agent, or Firm — Maiorana Patent Law, PA

(57) ABSTRACT

An apparatus comprising a plurality of capture devices and a processor. The plurality of capture devices may each be configured to generate a video signal in response to captured images. The processor may be configured to (i) receive the video signals from at least two of the capture devices, (ii) perform a video stitching operation on the video signals, (iii) generate a stitched video based on the video stitching operation and (iv) calculate image stabilization data for the stitched video based on (A) the stitched video signal and (B) motion information. Video data from one of the video signals is used to perform image stabilization for another of the video signals based on the image stabilization data.

19 Claims, 13 Drawing Sheets

(56) References Cited

U.S. PATENT DOCUMENTS

2016/0323560 A1\* 11/2016 Jin ..................... H04N 5/23238
2017/0078687 A1\* 3/2017 Coward ................ H04N 19/90

\* cited by examiner

IMAGE STABILIZATION FOR A MULTI-SENSOR CAMERA

FIELD OF THE INVENTION

The present invention relates to video capture devices generally and, more particularly, to a method and/or apparatus for implementing image stabilization for a multi-sensor camera.

BACKGROUND OF THE INVENTION

In a traditional, single image sensor/lens camera image stabilization is achieved by using gyroscope input to detect motion. Many sensors have extra margins that capture data that is not used as part of an image. For image stabilization in conventional image sensors, part of the extra margins are used to compensate for the motion (i.e., shaking).

Using the extra margins of the sensors achieves shake correction but introduces drawbacks. One drawback is that the extra margins need a higher resolution sensor to provide the extra margins. A higher resolution sensor is more expensive. Another drawback is that using the extra margin for image stabilization decreases a field of view available for the captured image. Another drawback is that the image stabilization needs extra processing bandwidth. Extra processing bandwidth results in a more expensive processor. Another drawback is that image stabilization using extra margins cannot be done in post-processing (i.e., using cloud processing). Since the data in the extra margins is not part of the output image, the extra margins are not available for post-processing. Since image stabilization must be done as the image is captured, a more expensive processor is needed.

It would be desirable to implement image stabilization for a multi-sensor camera.

SUMMARY OF THE INVENTION

The present invention concerns an apparatus comprising a plurality of capture devices and a processor. The plurality of capture devices may each be configured to generate a video signal in response to captured images. The processor may be configured to (i) receive the video signals from at least two of the capture devices, (ii) perform a video stitching operation on the video signals, (iii) generate a stitched video based on the video stitching operation and (iv) calculate image stabilization data for the stitched video based on (A) the stitched video signal and (B) motion information. Video data from one of the video signals is used to perform image stabilization for another of the video signals based on the image stabilization data.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Embodiments of the present invention include providing image stabilization for a multi-sensor camera that may (i) perform image stabilization of a multi-sensor video, (ii) provide data for image stabilization to be performed in post-processing, (iii) provide image stabilization information as metadata, (iv) use data from adjacent image sensors to compensate for motion, (v) be implemented as a system-on-a-chip, (vi) use gyroscope information to compensate for motion for multiple image sensors (vii) use digital motion estimation to compensate for motion for multiple image sensors and/or be (viii) be cost-effective to implement.

A camera system implementing two or more cameras capturing a 360 degree view may have information available for image stabilization. By using video information captured from other image sensors, image stabilization may be performed. The video information captured by other sensors may act as data from extra margins used by conventional image stabilization techniques. Using video information captured by other sensors as the extra margins for image stabilization may enable image stabilization to be performed without reducing a field of view. After video stitching is performed, the multi-sensor video may be analogous to a 3D world that may be rotated and/or moved around. The rotation and/or movement may be used for image stabilization based on motion information (e.g., data from a gyroscope). If the motion information is recorded, the image stabilization may be performed in post-processing.

Figure 1:
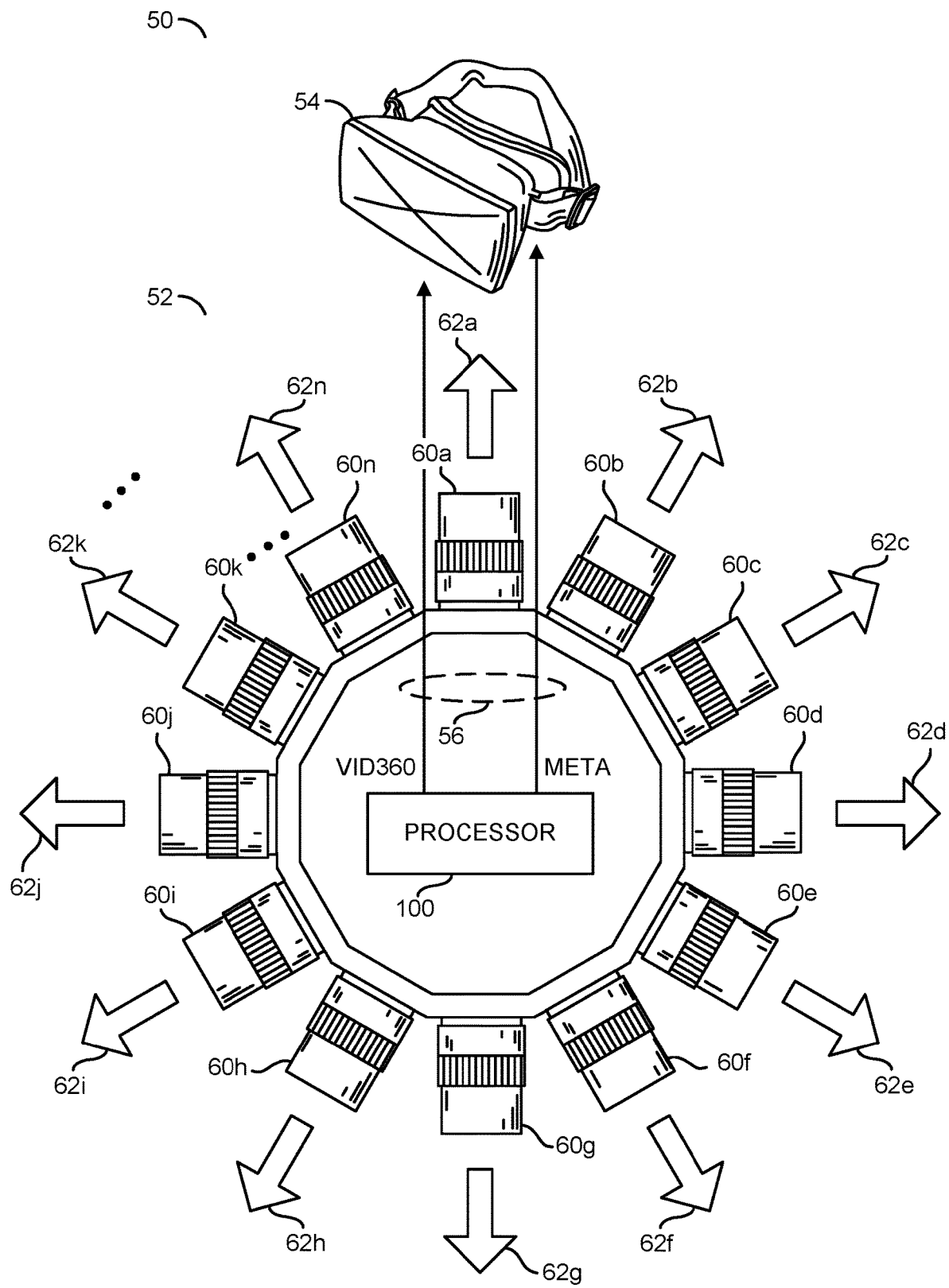
FIG. 1 is a diagram of a multi-sensor camera and an output device.

Referring to FIG. 1, a diagram of a system 50 of a multi-sensor camera and an output device is shown. The system 50 may comprise a camera 52, a playback device 54, a connection 56 and/or a block (or circuit 100). The camera 52 may be a 360 degree camera. The camera 52 may be implemented as a virtual reality (VR) camera. The camera 52 may comprise two or more lenses 60*a*-60*n*. Each of the lenses 60*a*-60*n* may be aimed in a respective direction 62*a*-62*n*. Aiming the lenses 60*a*-60*n* in the respective directions 62*a*-62*n* may enable the camera 52 to capture images of an environment surrounding the camera 52 from multiple perspectives. The multiple perspectives may be used to generate a multi-sensor video that is stitched together to provide a continuous field of view. The number of lenses 60*a*-60*n* and/or the respective directions 62*a*-62*n* captured may be varied according to the design criteria of a particular implementation.

The multi-sensor video may be a video comprising video data (e.g., video frames) from multiple sensors. Portions of the multi-sensor video may be stitched together to provide a continuous field of view (e.g., provide video data from the multiple sensors to create a larger field of view than a single one of the sensors is capable of providing). In an example, the multi-sensor video may be a 360 degree video (or near 360 degree video). In another example, the multi-sensor video may be a 270 degree video (or near 270 degree video). In yet another example, the multi-sensor video may be a 180 degree video (or near 180 degree video). In another example, the multi-sensor video may be implement a virtual reality video (e.g., to create an immersive effect for the viewer). In some embodiments, the multi-sensor video may implement a spherical field of view. In some embodiments, the multi-sensor video may implement a hemispherical field of view. The amount of data, a number of sensors and/or a range of field of view available in the multi-sensor video may be varied according to the design criteria of a particular implementation.

The playback device 54 is shown as a headset. In some embodiments, the playback device 54 may be a virtual reality (VR) headset. In some embodiments, the playback device 54 may be a handheld device (e.g., a smartphone). In an example, the playback device 54 may be implemented as a smartphone held in place by a mount (e.g., to allow the smartphone to be worn in front of the eyes of a user). The playback device 54 may enable a user (e.g., a viewer) to watch (e.g., experience) a multi-sensor video captured by the camera 52. The playback device 54 may be configured to crop the multi-sensor video in response to user input and/or a size of a display. The type of device implementing the playback device 54 may be varied according to the design criteria of a particular implementation.

The circuit 100 may be a processor and/or a system-on-a-chip (SOC). The processor 100 may be configured to analyze and/or process images captured by the camera 52. In some embodiments, the processor 100 may be configured to perform a video stitching operation on the images received from each of the lenses 60a-60n to generate the multi-sensor video. In some embodiments, the processor 100 may be configured to receive a multi-sensor video that has already been stitched. The functions, analysis and/or processes performed by the processor 100 may be varied according to the design criteria of a particular implementation.

The processor is shown transmitting a signal (e.g., VID360) and a signal (e.g., META). The signal VID360 may be the multi-sensor video (e.g., a 360 degree video). The signal META may be metadata. The signal VID360 and the signal META may be transmitted to the playback device 54 via the connection 56. The connection 56 may transmit both the signal VID360 and the signal META. For example, the signal META may be a metadata portion of the multi-sensor video signal VID360. Other signals may be transmitted between the processor 100 and the playback device 54.

In general, the processor 100 may be configured to perform image stabilization operations on a multi-sensor video. In some embodiments, the processor 100 may receive the signal VID360 as a stitched video signal, perform image stabilization, generate the signal META and forward the signal VID360 with the signal META to the playback device 54. In some embodiments, the processor 100 may be configured to receive video frames from the camera 52, perform video stitching operations to generate the multi-sensor video signal VID360 and perform image stabilization to generate the signal META. The playback device 54 may check the signal META to generate an image stabilized output on a per-frame basis. The types of data received by the processor 100 may be varied according to the design criteria of a particular implementation.

The signal VID360 may be a 360 degree (or near 360 degree) video. The processor 100 may be configured to rotate the data in the signal VID360 in any direction. In an example, the processor 100 may spin the 360 degree video data in the signal VID360 like a globe. The image stabilization may be performed by rotating the data in the signal VID360 to compensate for motion. In some embodiments, the compensation may be performed by the playback device 54 using the signal META as a post-processing technique.

Figure 2:
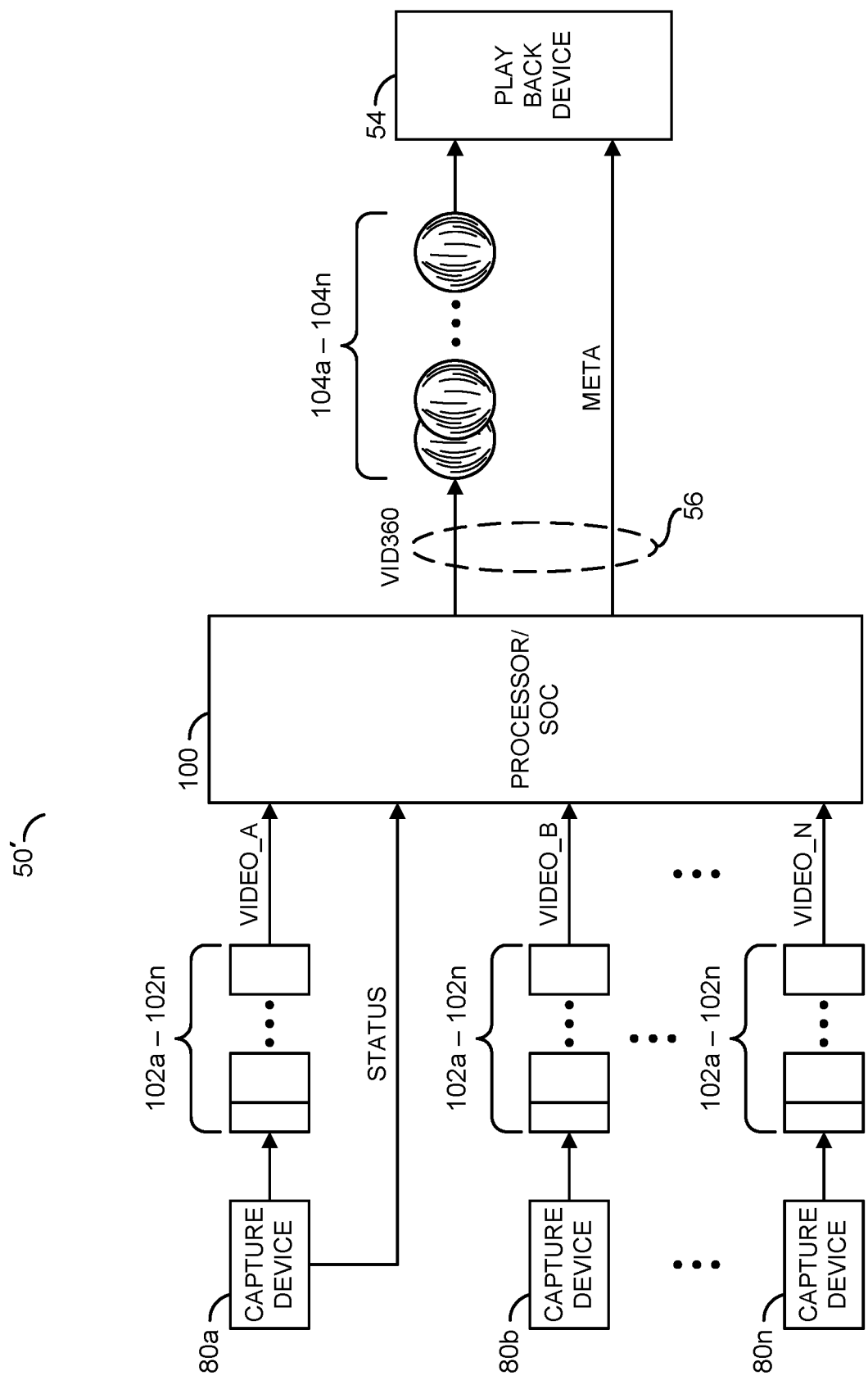
FIG. 2 is a block diagram of an example video stitching embodiment with image stabilization metadata.

Referring to FIG. 2, a block diagram illustrating an example video stitching and image stabilization metadata embodiment 50' is shown. The example video stitching embodiment 50' may comprise blocks (or circuits) 80a-80n, the processor 100 and the playback device 54. The circuits 80a-80n may be capture devices. Details of the capture devices 80a-80n are described in further detail in association with FIG. 6. The capture devices 80a-80n may be components of the camera 52. Each of the capture devices 80a-80n may are shown generating video frames 102a-102n. For example, the video frames 102a-102n may be images captured by corresponding lenses 60a-60n of the camera 52. The video frames 102a-102n from each of the capture devices 80a-80n may be transmitted to the processor 100 as video signals (e.g., VIDEO_A-VIDEO_N).

The capture device 80a is shown transmitting a signal (e.g., STATUS) to the processor 100. While the capture device 80a is shown generating the signal STATUS, the signal STATUS may be generated by any of the capture devices 80a-80n. In one example, more than one of the capture devices 80a-80n may generate the signal STATUS. In another example, only one of the capture devices 80a-80n may send the signal STATUS since the capture devices 80a-80n may be mounted to the camera 52 and motion data from one of the capture devices 80a-80n may be used for all of the capture devices 80a-80n (e.g., the motion of each of the capture devices 80a-80n is related). The signal STATUS may be generated in response to data received from various sensors (e.g., a gyroscope of the camera 52). The signal STATUS may be motion information. For example, the motion information of the signal STATUS may correspond to the video frames 102a-102n.

The processor 100 may receive the signals VIDEO_A-VIDEO_N. The processor 100 may receive the signal STATUS. The processor 100 may be configured to perform video stitching operations on the video frames 102a-102n in the signals VIDEO_A-VIDEO_N. The video stitching operations may be used to generate the signal VID360. The processor 100 may be configured to analyze and/or process the data in the signal VID360 and the motion data in the signal STATUS to perform image stabilization. The processor 100 may generate the signal META to provide the image stabilization. The image stabilization may be one or more of a correction for a wobble, a skewing, a smearing and/or a partial exposure. For example, the processor 100 may perform calculations to determine which pixels to move to perform image stabilization. The signal META may comprise results of the image stabilization calculations performed by the processor 100 (e.g., the image stabilization information).

The signal VID360 and the signal META may each be an output of the processor 100. The signal VID360 and the signal META may be transmitted via the connection 56. In an example, the connection 56 may be a cable (e.g., a physical connection). In another example, the connection 56 may be a wireless transmission. The method of transmitting the signal VID360 and the signal META from the processor 100 to the playback device 54 may be varied according to the design criteria of a particular implementation.

The signal VID360 is shown comprising one or more spherical video frames 104a-104n. The spherical video frames 104a-104n may be the video frames of the data in the signal VID360. The spherical video frames 104a-104n may be a stitched version of the video frames 102a-102n generated by the capture device 80a-80n.

The playback device 54 may receive the signal VID360 and the signal META. The playback device 54 may be a media device configured to display the signal VID360 for an end user. In some embodiments, the signal META may be a separate signal to the playback device 54. The playback device 54 may use the image stabilization information from the signal META to perform image stabilization for playback of the data in the signal VID360 in real time. For example, the playback device 54 may be configured to use the image stabilization information to perform a post-processing of the signal VID360. In some embodiments (e.g., where the playback device 54 does not support additional metadata input), the signal META may be added as part of a user input to the playback device 54. For example, the data in the signal VID360 may move in response to the head movement of the end user (e.g., the 360 video may rotate to the right when the user looks to the right). The image stabilization data in the signal META may be added to (or subtracted from) the user movement input to provide the image stabilization.

In some embodiments, the processor 100 may be configured to query capabilities of the playback device 54. For example, the query may be used to determine whether the playback device 54 is capable of reading the signal META. In some embodiments, the processor 100 may be implemented as part of a network of processors implemented to scale on demand (e.g., to implement cloud processing). The network of processors may serve the signal VID360 and the signal META to various devices with various playback capabilities. The query may be implemented to determine which type of multi-sensor video to send (e.g., resolution, format, frame-rate, etc.) and how to send the image stabilization data. For example, the processor 100 may not send all data available to conserve bandwidth if the playback device 54 responds to the query with an indication that the playback device 54 does not support particular features.

Figure 3:
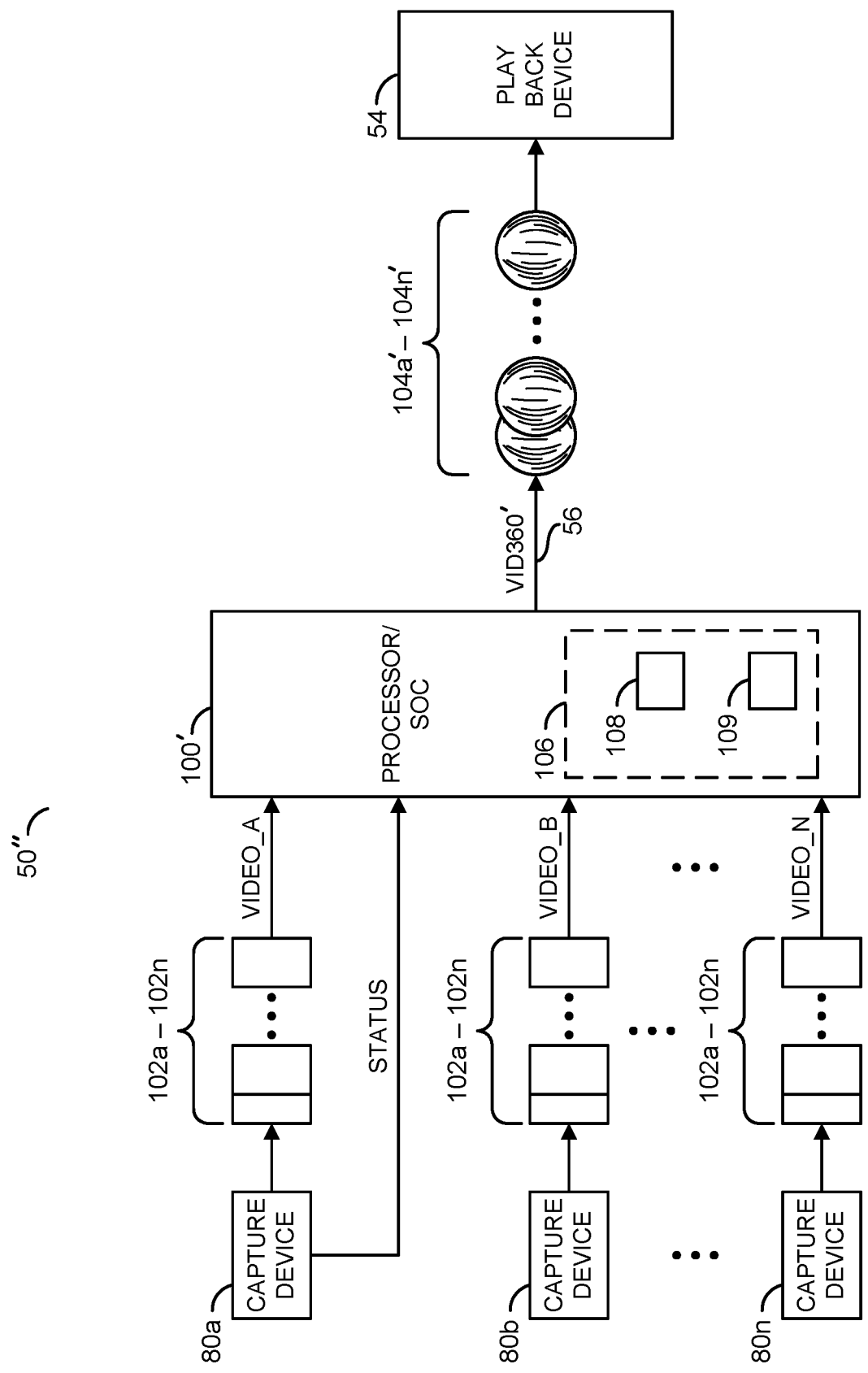
FIG. 3 is a block diagram of an example video stitching embodiment implementing image stabilization.

Referring to FIG. 3, a block diagram illustrating an example video stitching embodiment 50" implementing image stabilization is shown. The example video stitching embodiment 50" may comprise the capture devices 80a-80n, the processor 100' and/or the playback device 54. The capture devices 80a-80n and the processor 100' may be components of the camera 52. The camera 52 may be configured to generate the video signals VIDEO_A-VIDEO_N, generate the signal STATUS, perform the video stitching operations, and perform image stabilization for the output spherical video.

The processor 100' may receive the video signals VIDEO_A-VIDEO_N and the signal STATUS from the capture devices 80a-80n. The processor 100' may be configured to perform the video stitching operations to generate the spherical video frames and perform the image stabilization on the spherical video frames. The processor 100' may generate the signal VID360'. The signal VID360' may comprise the image stabilized spherical video frames 104a'-104n'.

The processor 100' may comprise a block (or circuit) 106. In some embodiments, the block 106 may comprise various components, modules and/or sub-modules implemented by the processor 100' (e.g., the block 106 is part of the SoC 100'). In some embodiments, the block 106 may not be part of the SoC 100' (e.g., the block 106 may be part of the camera 52). The block 106 may comprise a block (or circuit) 108, a block (or circuit) 109 and/or other components. The circuit 108 may be a video stitching module. The circuit 109 may be an image stabilization module. The components of the block 106 may be varied according to the design criteria of a particular implementation.

The video stitching module 108 may be configured to perform the video stitching operations. For example, the video stitching module 108 may take the video frames 102a-102n from each of the capture devices 80a-80n to create spherical video frames. Details of the video stitching operations performed by the video stitching module 108 will be described in detail in association with FIG. 7.

The image stabilization module 109 may be configured to perform image stabilization operations on the spherical video frames generated by the video stitching module 108. The image stabilization module 109 may calculate a movement of pixels from the various video frames (e.g., 102a-102n from each of the capture devices 80a-80n) to compensate for motion (e.g., artifacts that may result in negative effects in the output video). The image stabilization module 109 may apply the compensation calculated to the spherical video frames generated by the video stitching module 108. In an example, the image stabilization module 109 may re-create the spherical video frames with the image stabilization compensation applied.

In another example, the image stabilization module 109 may re-encode the spherical video frames generated by the video stitching module 108 to apply the image stabilization. In yet another example, the image stabilization module 109 may apply the image stabilization by presenting results of the image stabilization calculations to the video stitching module 108 to re-stitch the spherical video frames. In still another example, the image stabilization module 109 may apply the image stabilization by moving video data in the spherical video frames generated by the video stitching module 108. In some embodiments, the image stabilization module 109 and the video stitching module 108 may perform operations in parallel. The implementation of the image stabilization compensation performed by the image stabilization module 109 may be varied according to the design criteria of a particular implementation.

The operations performed by the video stitching module 108 and/or the image stabilization module 109 may generate the image stabilized spherical video frames 104a'-104n'. The image stabilized spherical video frames 104a'-104n' may be presented by the processor 100' as the signal VID360' to the playback device 54 via the connection 56. The signal VID360' may comprise spherical video frames that have already been compensated to counteract motion (e.g., the image stabilized spherical video frames 104a'-104n'). In an example, the playback device 54 may be configured to playback the image stabilized spherical video frames 104a'-104n' without any additional image stabilization metadata (e.g., the signal META may not be needed). From a perspective of the playback device 54, the image stabilized spherical video frames 104a'-104n' may be similar to other spherical video frames (e.g., no additional hardware and/or software is needed to play the image stabilized spherical video frames 104a'-104n').

Figure 4:
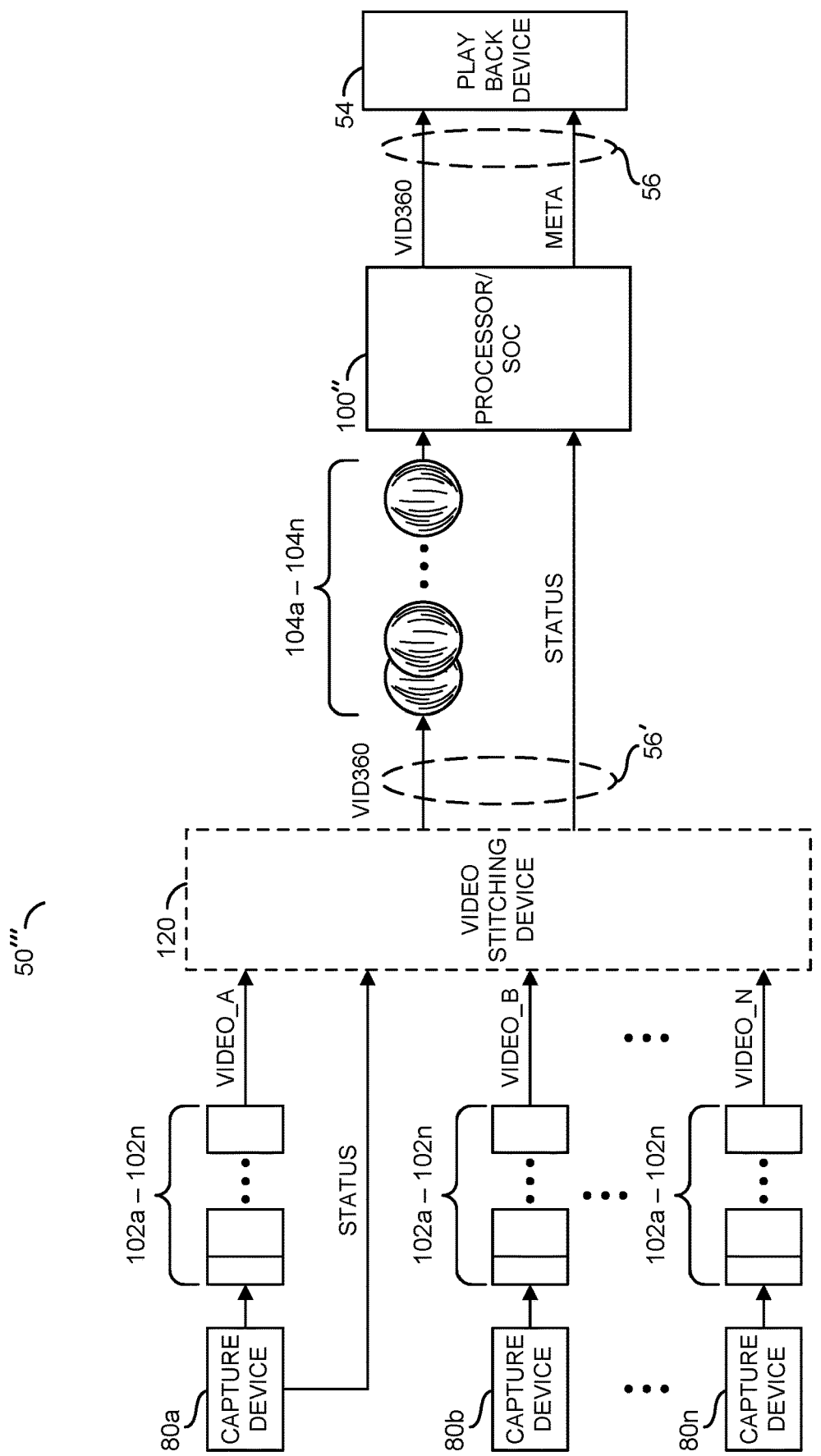
FIG. 4 is a block diagram of an embodiment connected to an external video stitching device.

Referring to FIG. 4, a block diagram 50''' illustrating an embodiment connected to an external video stitching device is shown. The example video stitching embodiment 50''' may comprise the capture devices 80a-80n, the processor 100'', the playback device 54 and/or a block (or circuit) 120. The circuit 120 may be a video stitching device. The capture devices 80a-80n may be configured to generate the video frames 102a-102n and the signal STATUS.

The video stitching device 120 may be configured to receive the signals VIDEO_A-VIDEO_N and the signal STATUS. The video stitching device 120 may be configured to perform video stitching operations on the video frames 102a-102n in the signals VIDEO_A-VIDEO_N. The video stitching operations may be used to generate the multi-sensor video. The multi-sensor video may be the output signal VID360 from the video stitching device 120. The video stitching device 120 may pass through the signal STATUS as an output.

In some embodiments, the video stitching device 120 may be implemented as a stand-alone computing device (e.g., a desktop computer). In some embodiments, the video stitching device 120 may be a cloud computing device (e.g., a network of processors configured to be scalable on demand). The implementation of the video stitching device 120 may be varied according to the design criteria of a particular implementation.

The video stitching device 120 may present the signal VID360 and the signal STATUS to the processor 100'' via the connection 56'. The processor 100'' may be configured to receive the spherical video frames 104a-104n and the signal STATUS. The processor 100'' may generate the signal META based on the spherical video frames 104a-104n and the motion information in the signal STATUS. The signal META may comprise the image stabilization information. The processor 100'' may pass through the signal VID360 and output the signal META. In some embodiments, the processor 100'' may be configured to perform encoding operations on the spherical video frames 104a-104n.

Figure 5:
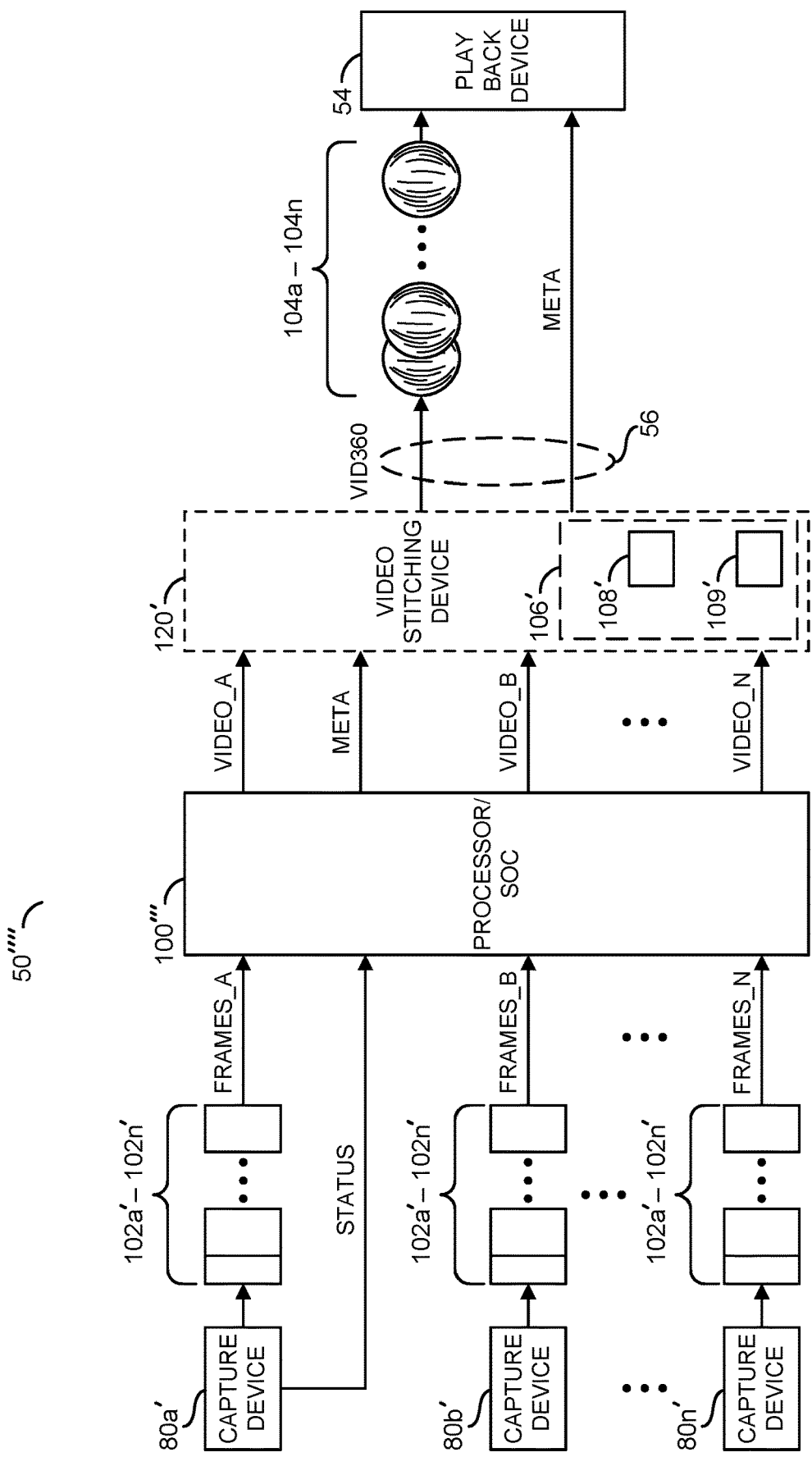
FIG. 5 is a block diagram of an alternate embodiment connected to an external video stitching device.

Referring to FIG. 5, a block diagram illustrating an alternate embodiment 50'''' connected to an external video stitching device is shown. The alternate embodiment 50'''' may comprise the capture devices 80a'-80n', the processor 100''', the video stitching device 120' and the playback device 54. In some embodiments, the capture devices 80a'-80n' and the processor 100''' may be components of the camera 52.

The capture devices 80a'-80n' may be configured to generate raw video frames 102a'-102n'. For example, the raw video frames 102a'-102n' may be uncompressed video data. The video frames 102a'-102n' may be presented to the processor 100''' as the signals FRAMES_A-FRAMES_N. One or more of the capture devices 80a'-80n' may be configured to present the motion information to the processor 100''' (e.g., the capture device 80a' is shown presenting the signal STATUS to the processor 100''').

The processor 100''' may receive the raw frames 102a'-102n' from the signals FRAMES_A-FRAMES_N. The processor 100''' may be configured to encode and/or compress the raw video frames 102a'-102n'. The processor 100''' may present an encoded version of the signals FRAMES_A-FRAMES_N to the video stitching device 120a' as the signals VIDEO_A-VIDEO_N. The processor 100''' may be configured to generate the signal META based on the signal STATUS and the information in the signals FRAMES_A-FRAMES_N. In some embodiments, the processor 100''' may be configured to present the signal META to the video stitching device 120'. In some embodiments, the processor 100''' may be configured to present the signal META directly to the playback device 54.

The video stitching device 120' may be configured to perform video stitching operations on the signals VIDEO_A-VIDEO_N to generate the multi-sensor video signal VID360. The video stitching device 120' may be configured to present the signal VID360 to the playback device 54 and pass through the signal META to the playback device 54.

In some embodiments, the video stitching device 120' may further comprise the block 106'. The video stitching device 120' may further comprise the video stitching module 108' and/or the image stabilization module 109'. For example, the capture devices 80a'-80n', the processor 100''' and the video stitching device 120' may be components of the camera 52. In an example, the processor 100''' may calculate the motion compensation, provide the signal META to the video stitching device 120' (e.g., another component of the camera 52), and the video stitching module 108' and the image stabilization module 109' may generate image stabilized spherical video frames 104a'-104n' based on the signals VIDEO_A-VIDEO_N and the calculations performed by the processor 100''' (e.g., data in the signal META). In the embodiments where the video stitching device 120' comprises the video stitching module 108' and/or the image stabilization module 109', the video stitching device 120' may generate the signal VID360' comprising the image stabilized spherical video frames 104a'-104n' to the playback device 54 without providing the signal META.

Figure 6:
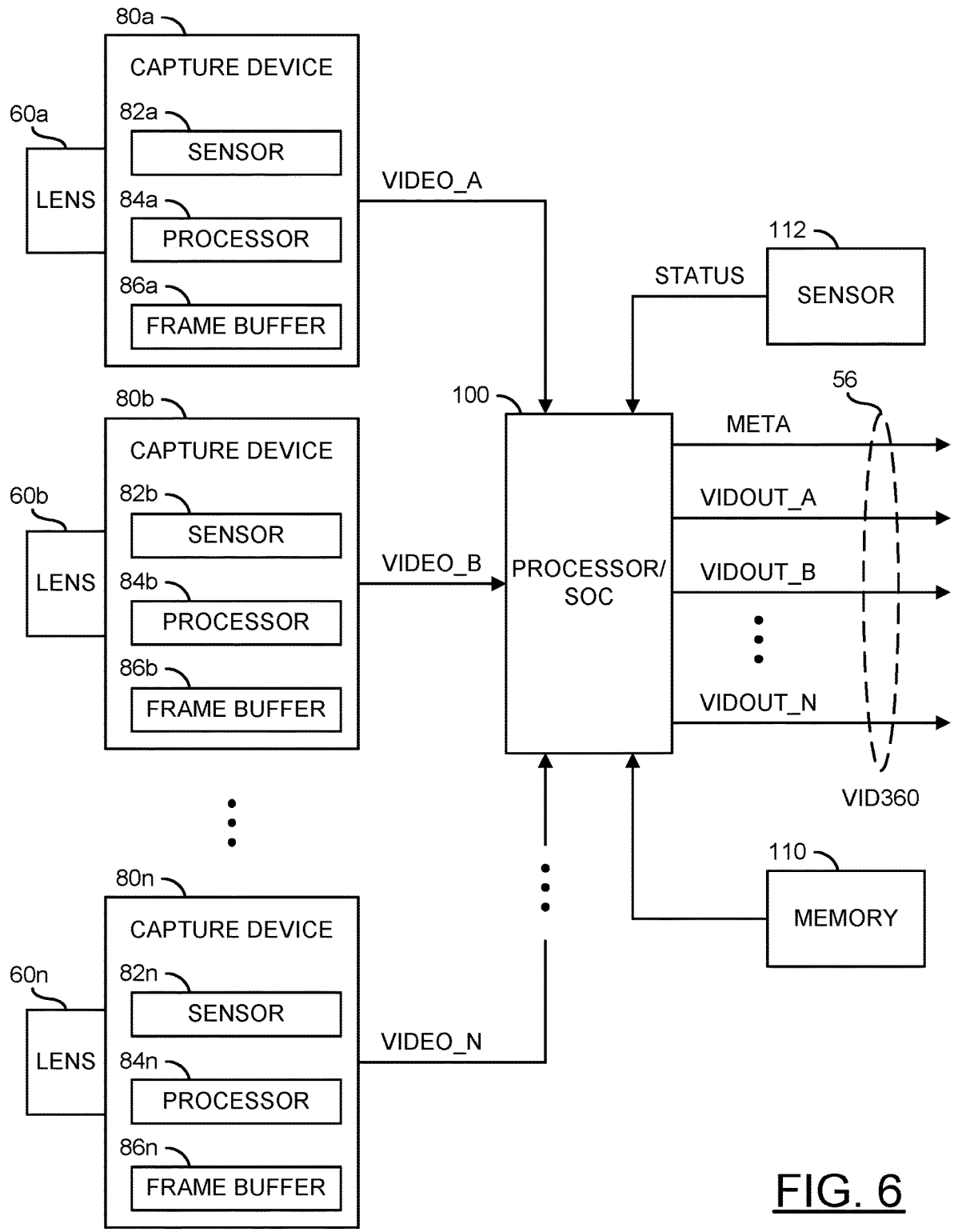
FIG. 6 is a block diagram illustrating a system-on-a-chip connected to multiple capture devices.

Referring to FIG. 6, a block diagram of the camera 52 illustrating a system-on-a-chip 100 connected to multiple capture devices 80a-80n is shown. The camera 52 may comprise the lenses 60a-60n, the capture devices 80a-80n, the SoC 100, a block (or circuit) 110 and/or a block (or circuit) 112. The circuit 110 may be a memory. The circuit 112 may be a sensor (e.g., a gyroscope). In some embodiments, the camera 52 may comprise the lenses 60a-60n, the capture devices 80a-80n and/or one or more of the SoC 100, the memory 110 and the sensor 112. In an example, the camera 52 may comprise the lenses 60a-60n, the capture devices 80a-80n and the gyroscope 112, and the SoC 100 and the memory 110 may be components of a separate device. The implementation of the camera 52 may be varied according to the design criteria of a particular implementation.

The lenses 60a-60n are shown attached to respective capture devices 80a-80n. The capture devices 80a-80n are shown respectively comprising blocks (or circuits) 82a-82n, blocks (or circuits) 84a-84n and blocks (or circuits) 86a-86n. The circuits 82a-82n may be sensors (e.g., image sensors). The circuits 84a-84n may be processors and/or logic. The circuits 86a-86n may be memory circuits (e.g., frame buffers).

The capture devices 80a-80n may be configured to capture video image data (e.g., light captured by the lenses 60a-60n). The capture devices 80a-80n may capture data received through the lenses 60a-60n to generate a bitstream (e.g., generate the video frames 102a-102n). The lenses 60a-60n may be directed, tilted, panned, zoomed and/or rotated: the environment surrounding the camera 52 (e.g., capture data from all the directions 62a-62n).

The capture devices 80a-80n may transform the received light into digital data (e.g., a bitstream). In some embodiments, the capture devices 80a-80n may perform an analog to digital conversion. For example, the capture devices 80a-80n may perform a photoelectric conversion of the light received by the lenses 60a-60n. The capture devices 80-80n may transform the bitstream into video data, a video file and/or the video frames 102a-102n (e.g., perform encoding). For example, the video data may be a digital video signal (e.g., the signals VIDEO_A-VIDEO_N). The digital video signal may comprise the video frames 102a-102n (e.g., sequential digital images and/or audio).

The video data captured by the camera 52 may be represented as the signals/bitstreams/data VIDEO_A-VIDEO_N (e.g., a digital video signal). The capture devices 80a-80n may present the signals VIDEO_A-VIDEO_N to the processor 100. The signals VIDEO_A-VIDEO_N may represent the video frames/video data 102a-102n. The signals VIDEO_A-VIDEO_N may be video streams captured by the capture devices 80a-80n.

The camera sensors 82a-82n may receive light from the respective lenses 60a-60n and transform the light into digital data (e.g., the bitstream). For example, the camera sensors 82a-82n may perform a photoelectric conversion of the light from the lenses 60a-60n. In some embodiments, the camera sensors 82a-82n may have extra margins that are not used as part of the image output. In some embodiments, the camera sensors 82a-82n may not have extra margins. In some embodiments, some of the camera sensors 82a-82n may have the extra margins and some of the camera sensors 82a-82n may not have the extra margins. The processor/logic 84a-84n may transform the bitstream into a human viewable content (e.g., video data that may be understandable to an average person regardless of image quality, such as the video frames 102a-102n). For example, the processors 84a-84n may receive pure (e.g., raw) data from the camera sensors 82a-82n and generate (e.g., encode) video data based on the raw data (e.g., the bitstream). The capture devices 80a-80n may have the memory 86a-86n to store the raw data and/or the processed bitstream. For example, the capture devices 80a-80n may implement the frame memory and/or buffers 86a-86n to store (e.g., provide temporary storage and/or cache) one or more of the video frames 102a-102n (e.g., the digital video signal). The processors/logic 84a-84n may perform analysis on the video frames 102a-102n stored in the memory/buffers 86a-86n of the capture devices 80a-80n.

The sensor 112 may be configured to capture motion data. The motion data may be data that may be used by the processor 100 to determine image stabilization information. In an example, the sensor 112 may be a gyroscope. The sensor 112 may be configured to generate the signal STATUS. In an example, the sensor 112 may comprise a location module, and an orientation module. In another example, the sensor 112 may be a magnetometer. The type of data and/or the number sensors 112 used to determine the image stabilization information may be varied according to the design criteria of a particular implementation.

The processor 100 may be configured to execute computer readable code and/or process information. The processor 100 may be configured to receive input and/or present output to the memory 110. The processor 100 may be configured to present and/or receive other signals (not shown). The number and/or types of inputs and/or outputs of the processor 100 may be varied according to the design criteria of a particular implementation.

The processor 100 may receive the signals VIDEO_A-VIDEO_N and/or the signal STATUS. The processor 100 may generate the signal META based on the signals VIDEO_A-VIDEO_N, the signal STATUS and/or other input. In some embodiments, the signal META may be generated based on analysis of the signals VIDEO_A-VIDEO_N and/or objects detected in the signals VIDEO_A-VIDEO_N performed by the processor 100. For example, the processor 100 may determine the motion information by analyzing a frame from the signals VIDEO_A-VIDEO_N and comparing the frame to a previous frame. The comparison may be used to perform digital motion estimation.

In some embodiments, the processor 100 may perform the video stitching operations. Details of the video stitching operations are described in association with FIG. 7. The processor 100 may generate the signals VIDOUT_A-VIDOUT_N. The signals VIDOUT_A-VIDOUT_N may be portions of the multi-sensor video VID360. The signals VIDOUT_A-VIDOUT_N may be generated in a format compatible with the video stitching device 120 and/or the playback device 54.

The memory 110 may store data. The memory 110 may be implemented as a cache, flash memory, DRAM memory, etc. The type and/or size of the memory 110 may be varied according to the design criteria of a particular implementation. The data stored in the memory 110 may correspond to a video file, motion information (e.g., readings from the sensors 112, video stitching parameters, image stabilization parameters, user inputs, etc.) and/or metadata information.

The lenses 60a-60n (e.g., camera lenses) may be directed to provide a view surrounding the camera 52. The lenses 60a-60n may be aimed to capture environmental data (e.g., light). The lenses 60a-60n may be wide-angle lenses and/or fish-eye lenses (e.g., lenses capable of capturing a wide field of view). The lenses 60a-60n may be configured to capture and/or focus the light for the capture devices 80a-80n. Generally, the camera sensors 82a-82n are located behind the lenses 60a-60n. Based on the captured light from the lenses 60a-60n, the capture devices 80a-80n may generate bitstreams and/or video data.

Data from the sensors 112 may be presented to the processor 100 as the signal STATUS. The sensors 112 may be used by the processor 100 to determine a movement direction (e.g., caused by a shacking, a skewing, a tilting, a juddering, etc.) of the camera 52. The movement direction may be used by the processor 100 to determine a type and/or amount of compensation to apply for image stabilization. For example, an orientation module may be implemented as a magnetometer, an accelerometer and/or a gyroscope.

Figure 7:
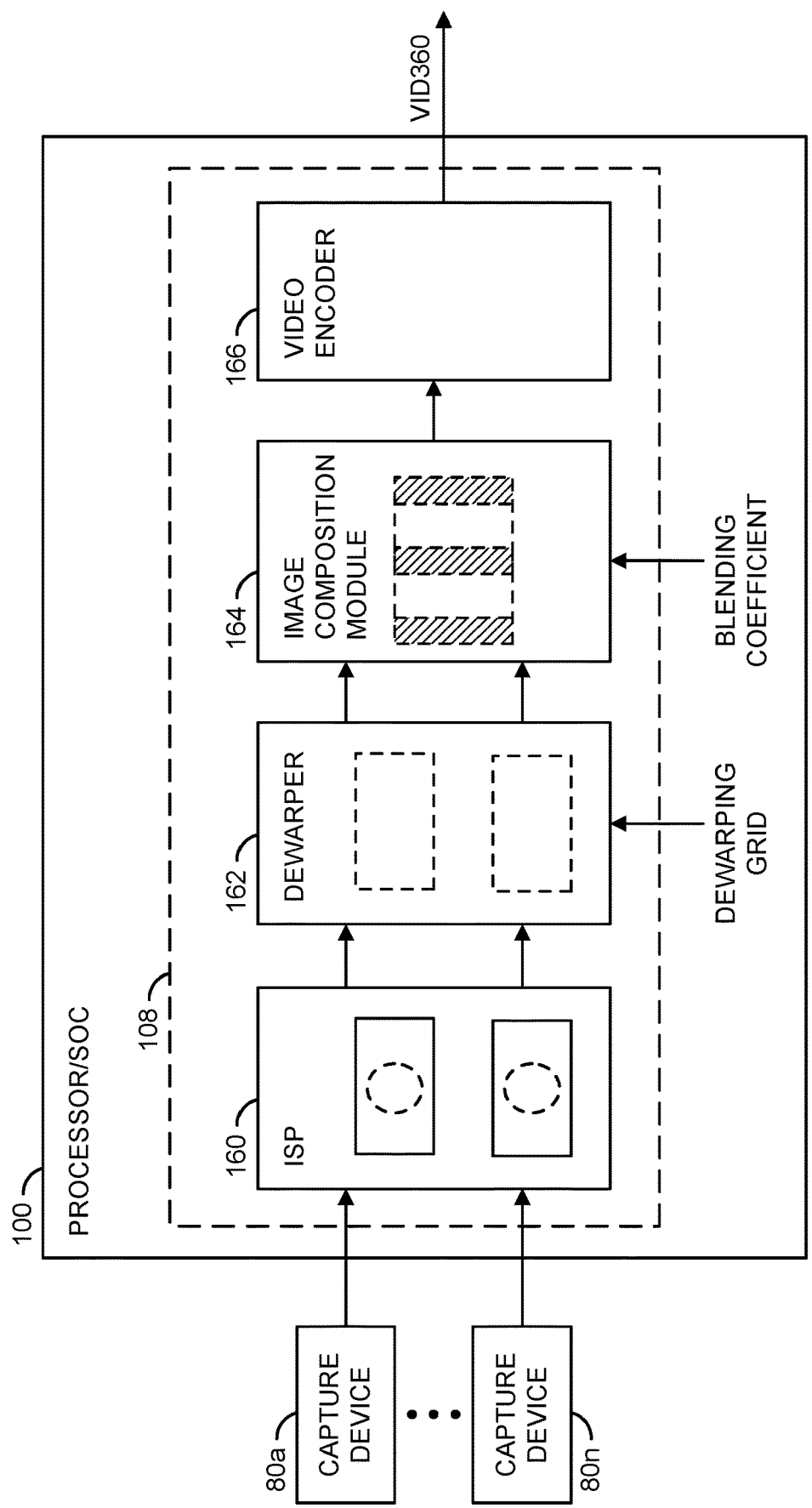
FIG. 7 is a block diagram illustrating an example video stitching operation.

Referring to FIG. 7, a block diagram illustrating an example video stitching operation by the processor 100 is shown. The processor 100 is shown receiving the video data from the capture devices 80a-80n. The processor 100 may comprise the video stitching module 108. The video stitching module 108 may comprise a block (or circuit) 160, a block (or circuit) 162, a block (or circuit) 164 and/or a block (or circuit) 166. The circuit 160 may be an image signal processor. The circuit 162 may be a dewarper. The circuit 164 may be an image composition module (e.g., an image blender, an image stitcher, a device configured to perform image composition, etc.). The circuit 166 may be a video encoder. In some embodiments, the circuits 160-166 may be individual modules (e.g., components) of the processor 100. In some embodiments, the circuits 160-166 may be combined modules of the processor 100. In some embodiments, the blocks 160-166 may be conceptual blocks based on instructions performed by the processor 100. Other types of circuits and/or additional circuits may be implemented. The components and/or circuits of the processor 100 may be varied according to the design criteria of a particular implementation.

The image signal processor (ISP) 160 may receive the signals VIDEO_A-VIDEO_N (e.g., the video frames 102a-

102*n*) from the capture devices 80*a*-80*n*. The capture devices 80*a*-80*n* may capture a wide angle view (e.g., from the fish-eye lenses 60*a*-60*n*). The image signal processor 160 may perform various video adjustments (e.g., noise reduction, real-time exposure control, white balance, focus, contrast adjustment, etc.). The types of adjustments performed by the image signal processor 160 may be varied according to the design criteria of a particular implementation. The image signal processor 160 may transfer the adjusted video frames to the dewarper 162.

The dewarper 162 may be configured to perform a dewarping operation on the adjusted video frames. Since the lenses 60*a*-60*n* provide a wide-angle view, the video frames 102*a*-102*n* may be distorted. The dewarper 162 may perform the dewarping operation based on dewarping grid parameters (e.g., stored in the memory 110). The dewarper 162 may modify the video frames 102*a*-102*n* to fit as portions of the continuous field of view. The dewarper 162 may transfer the dewarped video frames to the image composition module 164.

The image composition module 164 may be configured to blend (or stitch) the dewarped video frames and/or perform the video stitching operation. Since the lenses 60*a*-60*n* may capture overlapping portions of the environment surrounding the camera 52, the video frames 102*a*-102*n* may have overlapping video data. The image composition module 164 may blend the overlapping video data to create a seamless video stitch (e.g., to reduce and/or eliminate artifacts resulting from the image stitching operations). The image composition module 164 may stitch the dewarped video frames 102*a*-102*n* from each of the capture devices 80*a*-80*n* to create the multi-sensor video. The image composition module 164 may transfer the stitched video frames to the video encoder 166.

The video encoder 166 may perform encoding operations on the stitched video frames. Since the stitched video frames comprise video data from multiple capture devices 80*a*-80*n*, the stitched video may comprise a large amount of data. The encoding operations may reduce a file size (e.g., compress) of the multi-sensor video. The encoding operations may further enable compatibility of various playback formats (e.g., for compatibility with the playback device 54). The video encoder 166 may output the stitched video signal VID360 (e.g., the spherical video frames 104*a*-104*n*). In some embodiments, the video encoder 166 may output the signal VID360 to the image stabilization module 109 for motion compensation to be applied.

Figure 8:
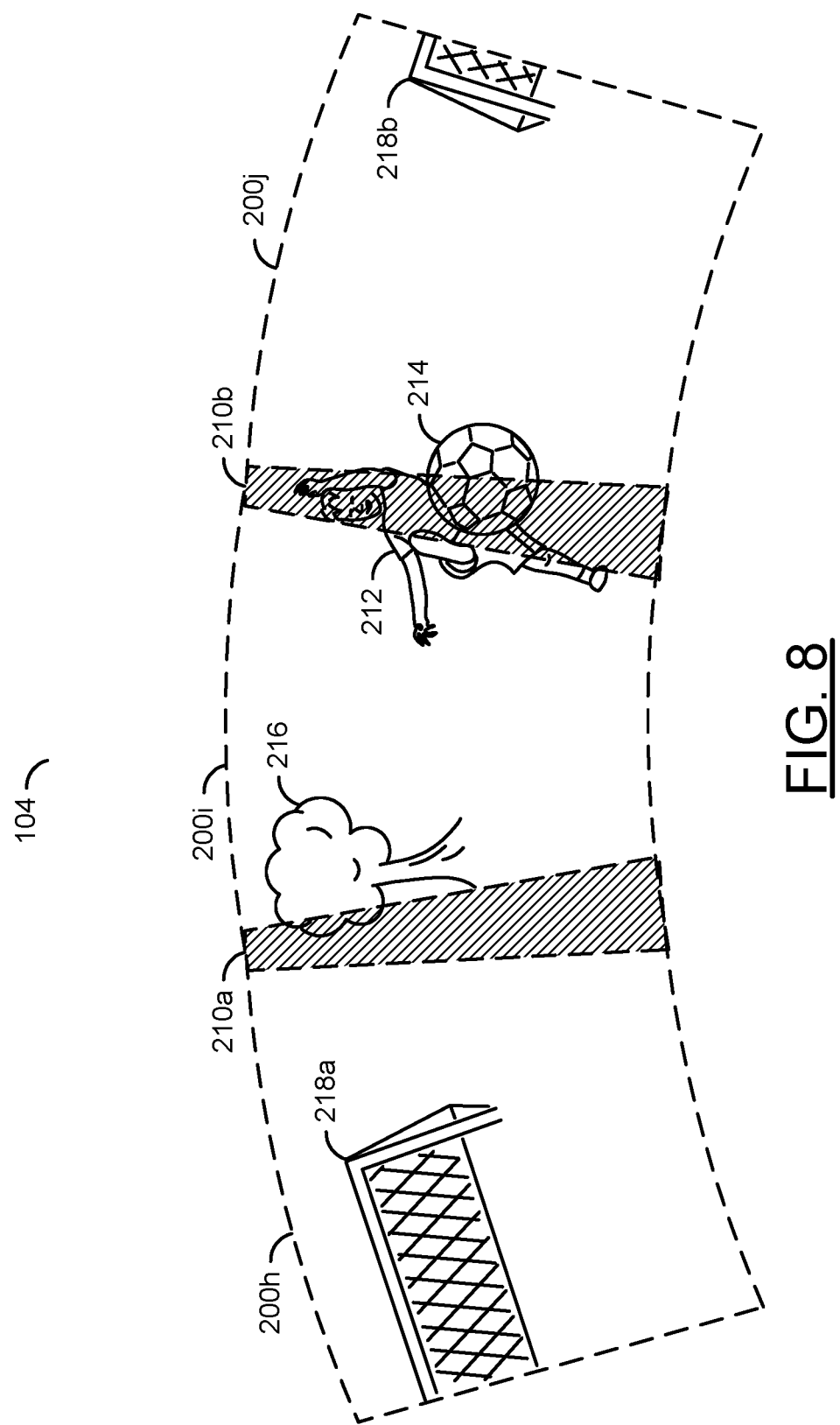
FIG. 8 is a diagram illustrating an example stitched video frame.

Referring to FIG. 8, a diagram illustrating an example stitched video frame 104 is shown. The stitched video frame 104 may be representative of one of the spherical video frames 104*a*-104*n*. The stitched video frame 104 is shown comprising stitched video frames 200*h*-200*j*. The stitched video frames 200*h*-200*j* may be stitched versions of the video frames 102*a*-102*n* captured by the capture devices 80*a*-80*n* at a particular moment in time. In an example, at a moment in time (e.g., a time A), each of the capture devices 80*a*-80*n* may capture a video frame (e.g., the video frames 102*a* from each of the capture devices 80*a*-80*n*). The processor 100 (or the video stitching device 120) may perform the video stitching operations to transform the captured video frames (e.g., the video frames 102*a* from each of the capture devices 80*a*-80*n*) to the stitched video frames 200*h*-200*j*. For example, each of the stitched video frames 200*h*-200*j* may represent a portion of the spherical video frame 104.

The stitched video frames 200*h*-200*j* may be a simplified representation of the spherical video frame 104. The stitched video frames 200*h*-200*j* may represent an equirectangular projection (e.g., a 2D representation of a 3D video). In some embodiments, there may be many more stitched video frames 200. For example, there may be stitched video frames above and/or below the stitched video frames 200*h*-200*j*. In another example, the stitched video frames 200*h*-200*j* may represent a row of the spherical video frame 104 and there may be additional stitched video frames (e.g., stitched video frames 200*a*-200*n*). The size, shape, and/or arrangement of the stitched video frames of the spherical video frame 104 may be varied according to the design criteria of a particular implementation.

The stitched video frames 200*h*-200*j* may be adjacent stitched video frames. For example, the stitched video frame 200*h* is adjacent to the stitched video frame 200*i* (e.g., neighboring to the right) and the stitched video frame 200*j* (e.g., neighboring to the left), the stitched video frame 200*i* is adjacent to the stitched video frame 200*j* (e.g., neighboring to the right) and the stitched video frame 200*h* (e.g., neighboring to the left), and the stitched video frame 200*j* is adjacent to the stitched video frame 200*h* (e.g., neighboring to the right) and the stitched video frame 200*i* (e.g., neighboring to the left). The adjacent stitched video frames 200*h*-200*j*, may provide a continuous field of view of the environment surrounding the camera 52. For example, the stitched video frames 200*h* and 200*j* may wrap around to connect the continuous field of view of the spherical video frame 104.

Overlapping areas 210*a* and 210*b* are shown. The overlapping area 210*a* between the stitched video frames 200*h* and 200*i* may be an area of the environment surrounding the camera 52 that has been captured by two of the capture devices 80*a*-80*n*. For example, the overlapping area 210*a* may be an area captured by both the capture device 80*h* (e.g., as part of the video frame 102*h*, which is then converted to the stitched video frame 200*h*) and the capture device 80*i* (e.g., as part of the video frame 102*i*, which is then converted to the stitched video frame 200*i*). In another example, the overlapping area 210*b* may be an area captured by both the capture device 80*I* (e.g., as part of the video frame 102*i*, which is then converted to the stitched video frame 200*i*) and the capture device 80*j* (e.g., as part of the video frame 102*j*, which is then converted to the stitched video frame 200*j*). An overlapping area may exist between the neighboring stitched video frames 200*h* and 200*j* (not shown). The processor 100 (or the video stitching device 120) may be configured to correct issues (e.g., artifact issues) caused by the overlapping areas 210*a*-210*b* (or other overlapping areas).

Objects are shown in the stitched video frames 200*h*-200*j*. For example, a person 212, a ball 214, a tree 216 and a goal 218*a*-218*b* may be objects in the stitched video frames 200*h*-200*j*. The person 212 and the ball 214 are shown on two of the stitched video frames 200*i* and 200*j*. The tree 216 is shown in the overlapping portion 210*a*. A portion of the goal 218*a* is shown in the stitched video frame 200*h* and a portion of the goal 208*b* is shown in the stitched video frame 200*j*. The goal 218*a*-218*b* extends across the two neighboring stitched video frames 200*h* and 200*j* to create a wraparound effect, which would not be noticeable in the 3D view. The 3D view of the spherical video frame 104 may show a continuous view of the goal 218*a*-218*b* as the user provides input (e.g., the user rotates the playback device 54).

Motion may negatively impact a quality of the objects 214-218 captured in the spherical video frame 104 (e.g., reduce quality, reduce immersion of the viewer, create video artifacts, etc.). In an example, motion that results in a negative effect may be caused by one of the objects (e.g., the movement of the person 212 and the ball 214) moving while the video frames 102a-102n are captured. In another example, the tree 216 may remain static in the spherical video frame 104 (e.g., no motion caused by the object). In yet another example, motion may be caused due to external forces acting on the camera 52 (e.g., shaking of the camera 52). Various types of motion may result in negative effects and/or have a negative impact of the video quality, which may result in various visible motion artifacts.

In some embodiments, the negative effects of motion may result in motion blur. In some embodiments, the negative effects of motion may result in a wobble. In some embodiments, the negative effects of motion may result in a smearing effect. In some embodiments, a rolling shutter effect may cause negative effects (e.g., skewing and/or partial exposure). For example, the rolling shutter effect may be caused by the capture devices 80a-80n. In some embodiments, the processor 100 may be configured to counteract the rolling shutter effect by moving pixels in the stitched video frames 200h-200j different amounts. For example, the rolling shutter effect may cause a motion artifact that is more noticeable at a top of the video frame than at the bottom of the video frame. The processor 100 may move the pixels at the top of the stitched video frames 200h-200j a greater amount than the pixels at the bottom of the stitched video frames 200h-200j to counteract the rolling shutter effect. The processor 100 may be configured to analyze the spherical video frame 104 and/or the video frames 102a-102n to detect the negative effects. The processor 100 may be configured to compensate for (or correct) the negative effects.

In an example, the processor 100 may determine that moving pixels of the stitched video frames 200h-200j in a particular direction may counteract the negative effects caused by motion. For example, pixels in the stitched video frame 200i may be moved to compensate for motion impacting the image quality of the tree 216. In another example, pixels from both the stitched video frames 200i and 200j may be moved to compensate for motion impacting the image quality of the person 212 and the ball 214. Generally, pixels from all of the stitched video frames (e.g., 200a-200n, 202a-202n, 204a-204n, 206a-206n, etc.) may be moved since the field of view of the spherical video frame 104 is continuous. However, without the processor 100 moving pixels in the stitched video frames 200h-200j, blank areas may be left in the stitched video frames 200h-200j because no additional data is available from each of the capture devices 80a-80n.

The processor 100 may be configured to use pixels from the neighboring stitched video frames 200h-200j to ensure no blank spaces result from moving the pixels. Since the stitched video frames 200h-200j provide a continuous field of view, the processor 100 may move the pixels from an adjacent stitched video frame to another of the stitched video frame. For example, pixels from the stitched video frame 200i may be moved to the stitched video frame 200j, while pixels from the stitched video frame 200j may be moved to the adjacent stitched video frame 200h. The number of pixels moved between adjacent stitched video frames may be varied according to the design criteria of a particular implementation.

In some embodiments, the processor 100 may move the pixels of the stitched video frames 200h-200j. In some embodiments, the processor 100 may determine (e.g., calculate) the amount of pixels that should be moved between the adjacent stitched video frames 200h-200j. The calculation by the processor 100 may be the image stabilization data. The image stabilization data may be used by other devices (e.g., the playback device 54) to compensate for the negative effects of motion in real-time during playback of the spherical video frames 104a-104n. The image stabilization data may be transmitted as metadata along with the spherical video frames 104a-104n. For example, the image stabilization data may be presented by the processor 100 as the signal META.

Figure 9:
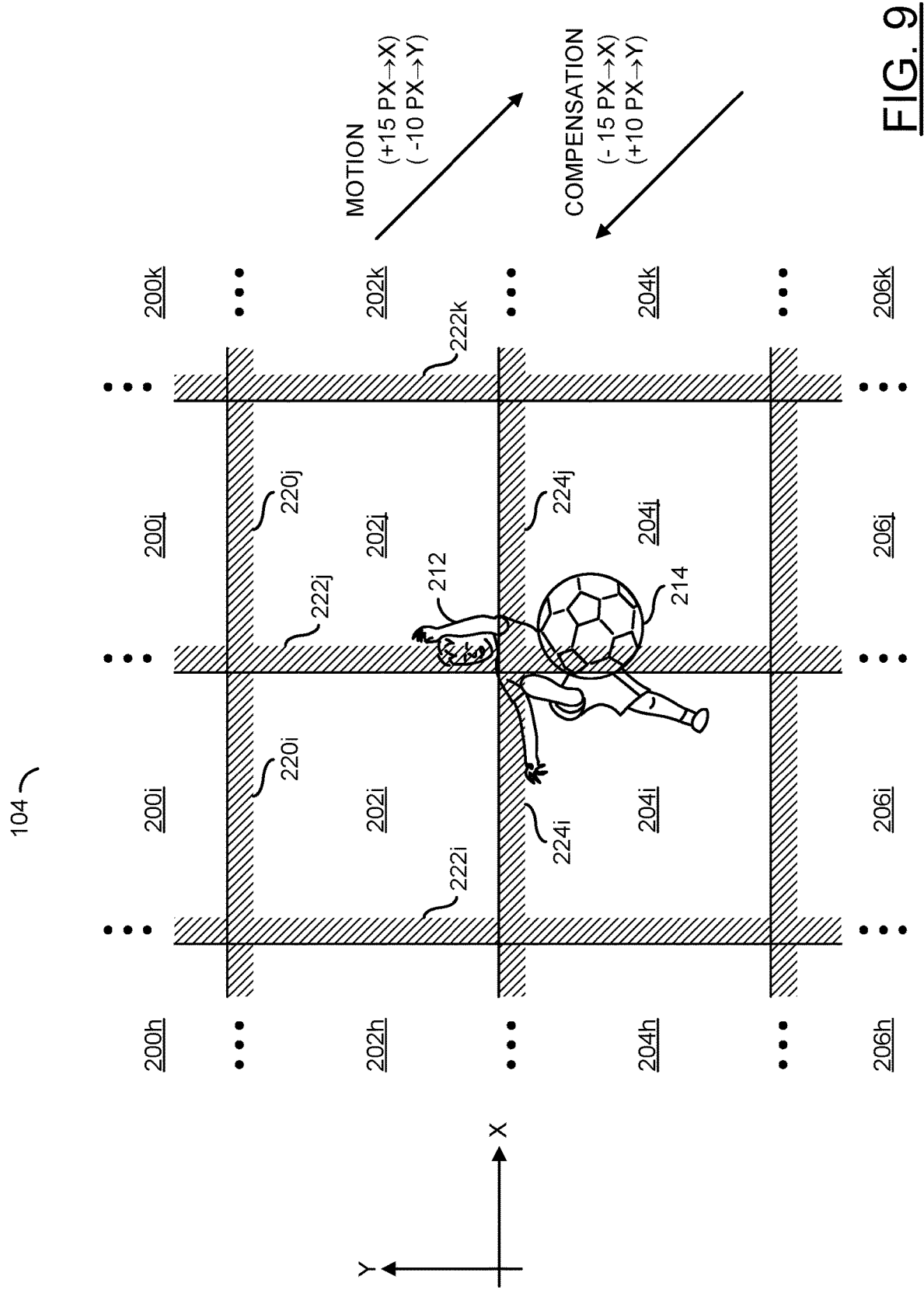
FIG. 9 is a diagram illustrating an example image compensation.

Referring to FIG. 9, a diagram illustrating an example image compensation is shown. An example portion of a spherical video frame 104 is shown. The example portion of a spherical video frame 104 may be represented as an equirectangular projection. The example portion of a spherical video frame 104 may comprise various groups of stitched video frames 200a-200n, 202a-202n, 204a-204n, 206a-206n, etc. Each group of the of the stitched video frames shown (e.g., 200h-200k, 202h-202k, 204h-204k, 206h-206k, etc.) may represent a row of the spherical video frame 104. The groups of stitched video frames (e.g., 200a-200n, 202a-202n, 204a-204n, 206a-206n, etc.) may provide a continuous field of view in all directions to provide a 3D view of the environment surrounding the camera 52.

The person 212 is shown as part of the stitched video frames 202i, 202j, 204i and 204j. The ball 214 is shown as part of the stitched video frames 204i and 204j. The processor 100 may determine that there is motion in a particular direction. In the example, shown the motion may be 15 pixels to the right and 10 pixels down. In one example, the sensor 112 may determine the motion direction and provide the motion direction to the processor 100 in the signal STATUS (e.g., electronic image stabilization (EIS)). In another example, the processor 100 may be configured to analyze the spherical video frames 104a-104n (e.g., detect the objects 212-218) to determine motion. For example, the processor 100 may perform digital motion estimation (e.g., digital image stabilization (DIS)). The type of motion estimation may be varied according to the design criteria of a particular implementation.

The processor 100 may be configured to determine an amount of compensation to perform image stabilization to counteract the negative effects. In the example shown, the compensation may be a movement of the pixels of each of the stitched video frames (e.g., 200h-200k, 202h-202k, 204h-204k, 206h-206k, etc.) 15 pixels to the left and 10 pixels up. Since the spherical video frame 104 comprises a continuous field of view (e.g., the stitched video frames 200a-200n, 202a-202n, 204a-204n, 206a-206n, etc. wrap around and connect, similar to a globe) the processor 100 may leverage information (e.g., pixels) from adjacent stitched video frames to implement the compensation.

Pixels 220i may be the topmost 10 rows of pixels of the stitched video frame 202i. Pixels 222i may be the leftmost 15 columns of pixels of the stitched video frame 202i. Pixels 220j may be the topmost 10 rows of pixels of the stitched video frame 202j. Pixels 222j may be the leftmost 15 columns of pixels of the stitched video frame 202j. Pixels 222k may be the leftmost 15 columns of pixels of the stitched video frame 202k. Pixels 224i may be the topmost 10 rows of pixels of the stitched video frame 204i. Pixels 224j may be the topmost 10 rows of pixels of the stitched video frame 224j.

In an example, to perform the compensation for the image stabilization, the processor 100 may move the pixels 220i up from the stitched video frame 202i to the stitched video frame 200i and move the pixels 222i left from the stitched video frame 202i to the stitched video frame 202h (some of the pixels 220i and the pixels 222i may end up in the stitched video frame 200*h*). Continuing the example, to perform the compensation for the image stabilization, the processor 100 may move the pixels 220*j* up from the stitched video frame 202*j* to the stitched video frame 200*j* and move the pixels 222*j* from the stitched video frame 202*j* left to the stitched video frame 202*i* (some of the pixels 220*j* and the pixels 222*j* may end up in the stitched video frame 200*i*). Continuing the example, to perform the compensation for the image stabilization, the processor 100 may move the pixels 222*k* left from the stitched video frame 202*k* to the stitched video frame 202*j* (some of the pixels 222*k* may end up in the stitched video frame 200*j*). Continuing the example, to perform the compensation for the image stabilization, the processor 100 may move the pixels 224*i* up from the stitched video frame 204*i* to the stitched video frame 202*i* (some of the pixels 224*i* may end up in the stitched video frame 202*h*). Continuing the example, to perform the compensation for the image stabilization, the processor 100 may move the pixels 224*j* up from the stitched video frame 204*j* to the stitched video frame 202*j* (some of the pixels 224*j* may end up in the stitched video frame 202*i*). Similarly, the processor 100 may move other pixels from other of the stitched video frames to adjacent stitched video frames.

The processor 100 may use information (e.g., the pixels 220*i*, 220*j*, 222*i*, 222*j*, etc.) captured by the multiple sensors 82*a*-82*n* to stabilize the video (e.g., the spherical video frames 104*a*-104*n*). The sensor 112 may record motion data (e.g., gyro data) to determine the motion information. The processor 100 may generate the information about which pixels to move to which stitched video frames (e.g., the signal META). The image stabilization may be performed in post-processing (e.g., at the playback device 54) without decreasing the field of view.

Figure 10:
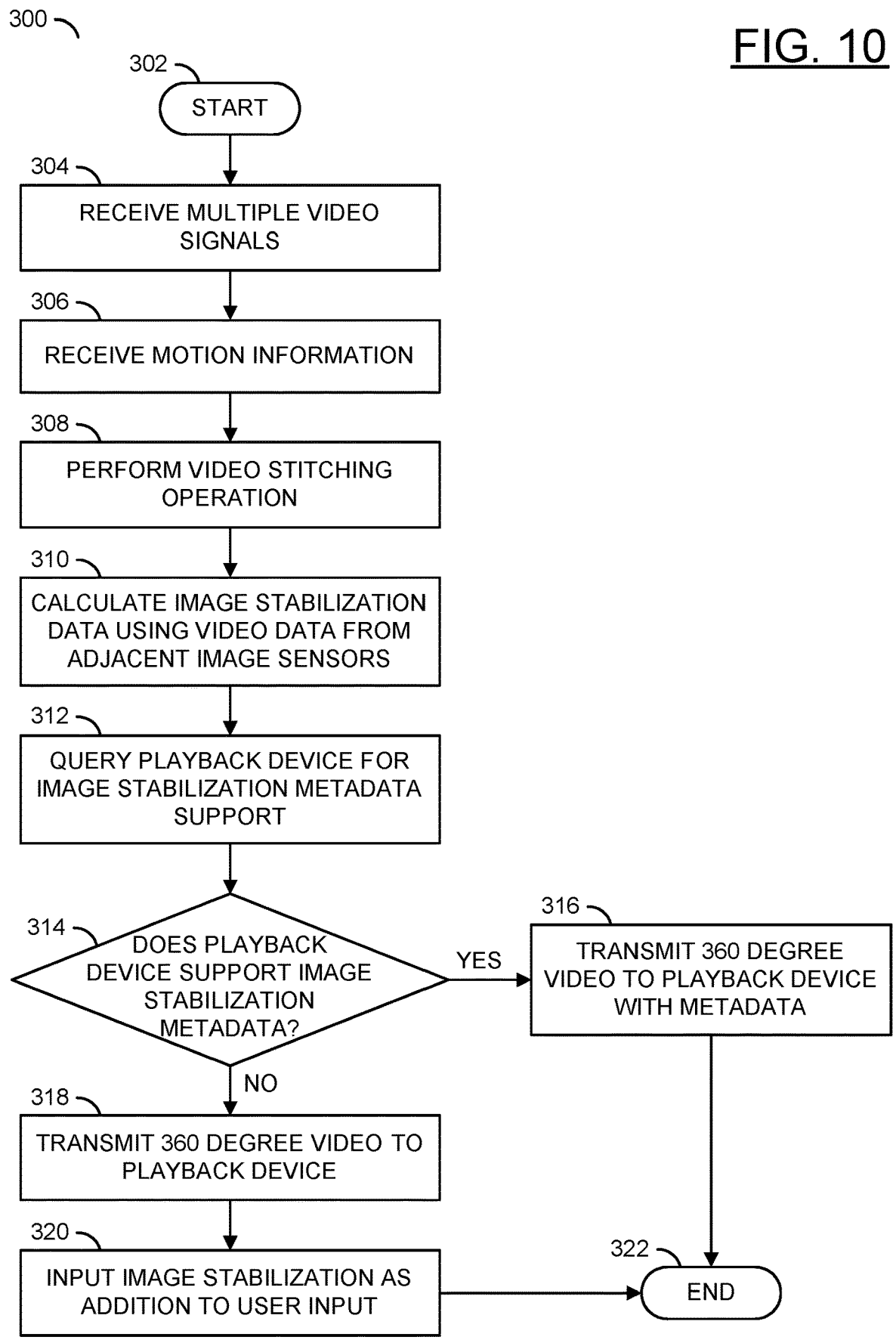
FIG. 10 is a flow diagram illustrating a method for generating image stabilization metadata.

Referring to FIG. 10, a method (or process) 300 is shown. The method 300 may generate image stabilization metadata. The method 300 generally comprises a step (or state) 302, a step (or state) 304, a step (or state) 306, a step (or state) 308, a step (or state) 310, a decision step (or state) 312, a step (or state) 314, a step (or state) 316, a step (or state) 318, a step (or state) 320, and a step (or state) 322.

The state 302 may start the method 300. In the state 304, the processor 100 may receive multiple video signals (e.g., the signals VIDEO_A-VIDEO_N) from the capture devices 80*a*-80*n*. In the state 306, the processor 100 may receive the motion information (e.g., the signal STATUS) from one or more of the capture devices 80*a*-80*n*. Next, in the state 308, the processor 100 may perform the video stitching operation (e.g., as described in association with FIG. 7). In the state 310, the processor 100 may calculate the image stabilization data using the video data (e.g., pixels) from the adjacent image sensors (e.g., data from the adjacent stitched video frames 200*a*-200*n*). In the state 312, the processor 100 may query the playback device 54 for image stabilization metadata support. Other information about the capabilities of the playback device 54 may also be queried (e.g., supported resolutions, supported frame rates, supported formats, etc.). Next, the method 300 may move to the decision state 314.

In the decision state 314, the processor 100 may determine whether the playback device 54 supports the image stabilization metadata (e.g., based on a response to the query from the playback device 54). If the processor 100 determines the playback device 54 does support the image stabilization metadata, the method 300 may move to the state 316. In the state 316, the processor 100 may transmit the 360 degree video (e.g., the signal VID360) to the playback device 54 with the metadata (e.g., the signal META). Next, the method 300 may move to the state 322.

If the processor 100 determines the playback device 54 does not support the image stabilization metadata, the method 300 may move to the state 318. In the state 318, the processor 100 may transmit the 360 degree video (e.g., the signal VID360) to the playback device 54. Next, in the state 320, the processor 100 may input the image stabilization data (e.g., the signal META) as an addition to a user input to the playback device 54. Next, the method 300 may move to the state 322. The state 322 may end the method 300.

In some embodiments, the query in the state 312 may not be performed. For example, the capability of the playback device 54 may be unknown to the processor 100. If no query is performed, the processor 100 may send the signal META and the playback device 54 may use the image stabilization data in the signal META, or the playback device 54 may ignore the image stabilization data if no capability is available.

Figure 11:
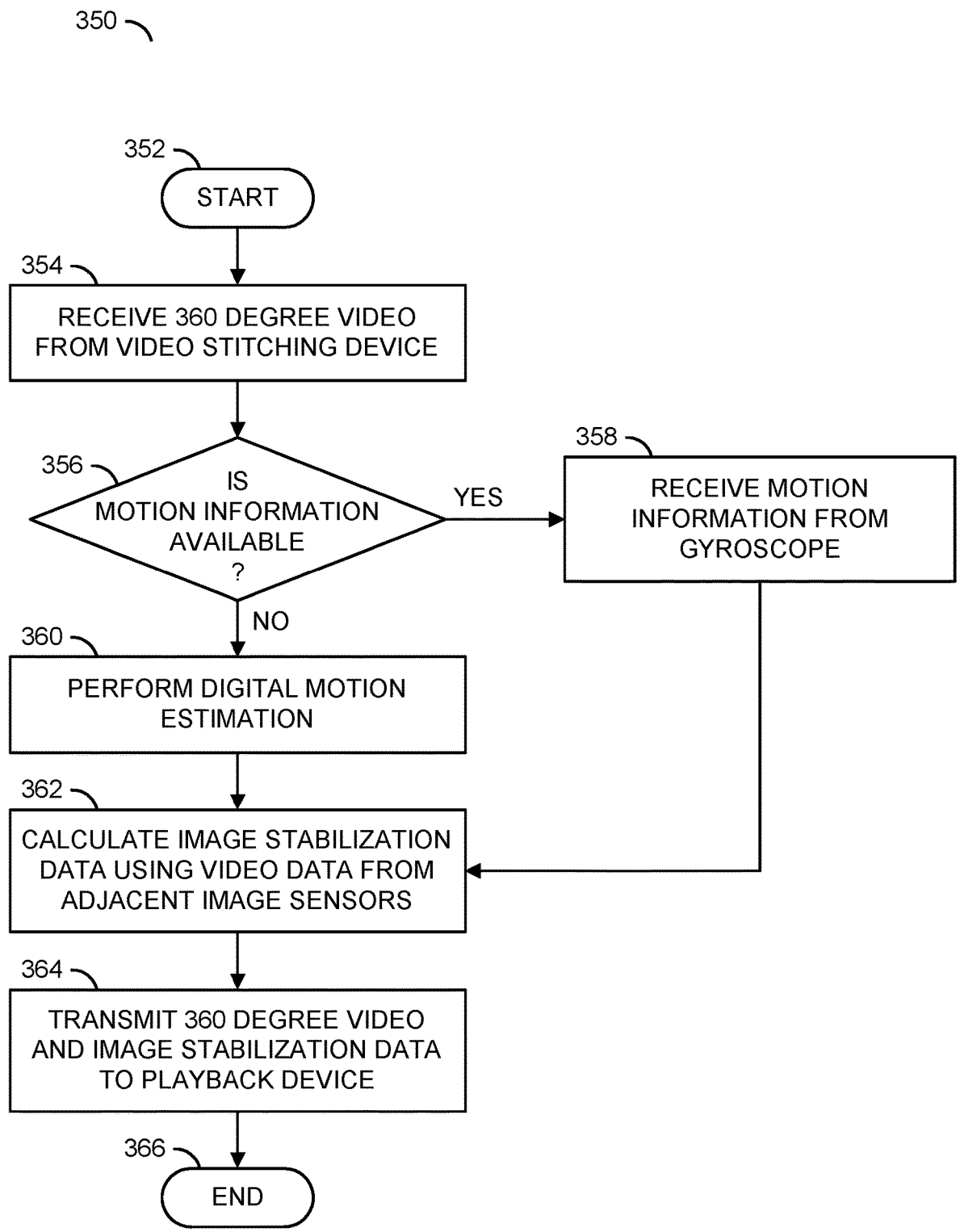
FIG. 11 is a flow diagram illustrating a method for determining image stabilization data.

Referring to FIG. 11, a method (or process) 350 is shown. The method 350 may determine image stabilization data. The method 350 generally comprises a step (or state) 352, a step (or state) 354, a decision step (or state) 356, a step (or state) 358, a step (or state) 360, a step (or state) 362, a step (or state) 364, and a step (or state) 366.

The state 352 may start the method 350. In the state 354, the processor 100 may receive the 360 degree video (e.g., the signal VID360) from the video stitching device 120. Next, the method 350 may move to the decision state 356. In the decision state 356, the processor 100 may determine whether motion information (e.g., the signal STATUS) is available. If the signal STATUS is available, the method 350 may move to the decision state 358. In the state 358, the processor 100 may receive the motion information (e.g., the signal STATUS) from the gyroscope 112. Next, the method 350 may move to the state 362. In the decision state 356, if the processor 100 determines the signal STATUS is not available, the method 350 may move to the state 360.

In the state 360, the processor 100 may perform a digital motion estimation of the stitched video frames (e.g., the stitched video frames 200*a*-200*n*, 202*a*-202*n*, 204*a*-204*n*, 206*a*-206*n*, etc.). Next, the method 350 may move to the state 362. In the state 362, the processor 100 may calculate the image stabilization data using the video data (e.g., pixels) from the adjacent image sensors (e.g., data from the adjacent stitched video frames 200*a*-200*n*). In the state 364, the processor 100 may transmit the 360 degree video (e.g., the signal VID360) and the image stabilization data (e.g., the signal META) to the playback device 54. Next, the method 350 may move to the state 366, which may end the method 350.

Figure 12:
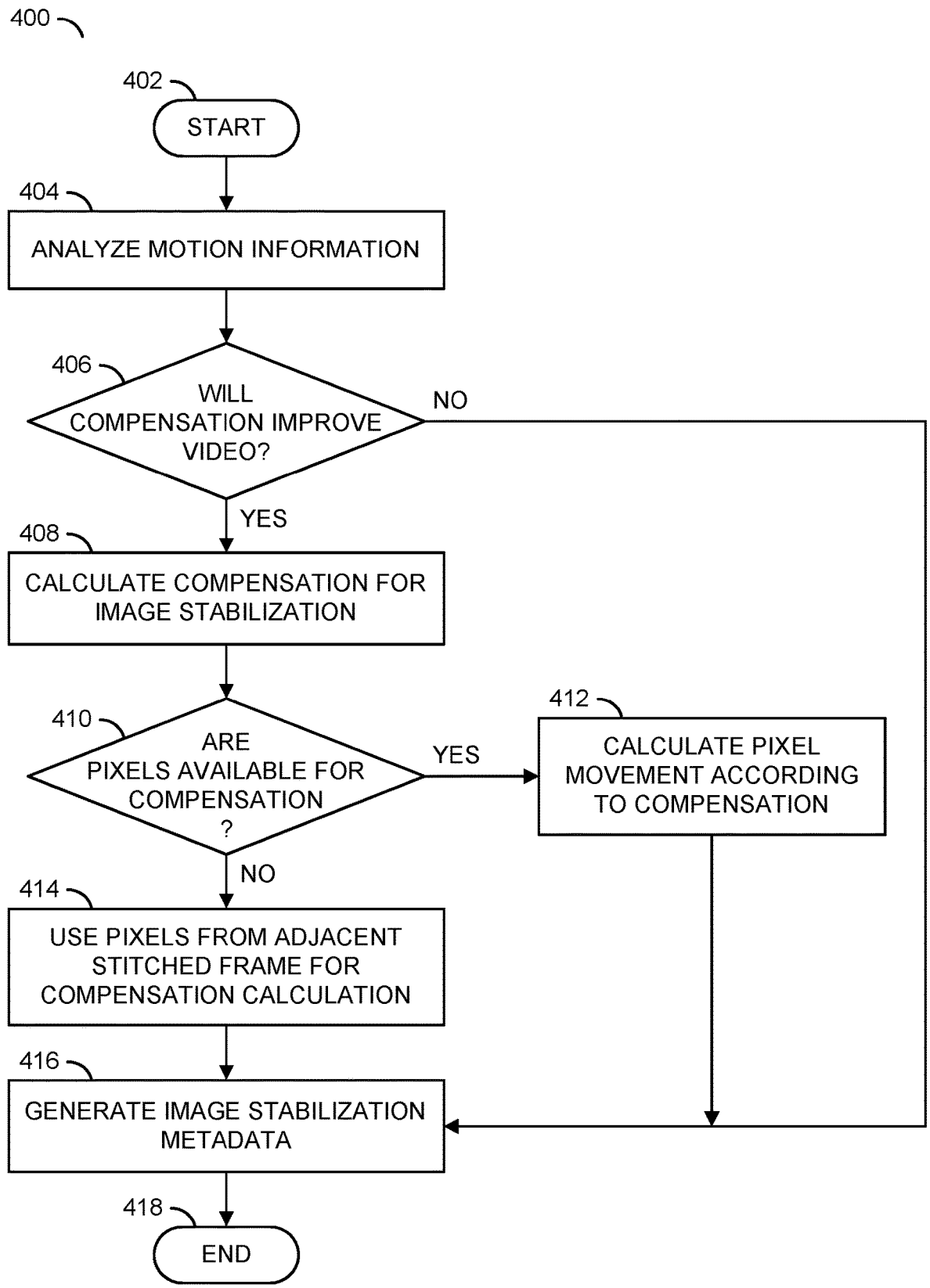
FIG. 12 is a flow diagram illustrating a method for generating image stabilization metadata using pixels from adjacent stitched video frames.

Referring to FIG. 12, a method (or process) 400 is shown. The method 400 may generate image stabilization metadata using pixels from adjacent stitched video frames. The method 400 generally comprises a step (or state) 402, a step (or state) 404, a decision step (or state) 406, a step (or state) 408, a decision step (or state) 410, a step (or state) 412, a step (or state) 414, a step (or state) 416, and a step (or state) 418.

The state 402 may start the method 400. In the state 404, the processor 100 may analyze the motion information (e.g., the signal STATUS and/or the digital motion estimation). Next, the method 400 may move to the decision state 406. In the decision state 406, the processor 100 may determine whether compensation will improve the video (e.g., whether there are negative effects to the video quality). If not, the method 400 may move to the state 416. If so, the method 406 may move to the state 408.

In the state 408, the processor 100 may calculate compensation for image stabilization. Next, the method 400 may move to the decision state 410. In the decision state 410, the processor 100 may determine whether there are pixels available for compensation (e.g., within the stitched video frames 200a-200n and/or within the extra margins captured by the sensors 82a-82n). If the processor 100 determines there are pixels available for compensation, the method 400 may move to the state 412. In the state 412, the processor 100 may calculate pixel movement according the compensation calculated (e.g., determine values for a format compatible with the signal META). Next, the method 400 may move to the state 416.

In the decision state 410, if the processor 100 determines there are not more pixels available for compensation, the method 400 may move to the state 414. In the state 414, the processor 100 may use pixels (e.g., the pixels 220i, 220j, 2221, 222j, 2241, 224j, etc.) from the adjacent stitched video frames (e.g., the stitched video frames 2021, 202j, 2041, 204j, etc.) for the compensation calculation. Next, the method 400 may move to the state 416. In the state 416, the processor 100 may generate the image stabilization metadata (e.g., the signal META) based on the compensation calculations (e.g., performed in the states 412 and/or 414). Next, the method 400 may move to the state 418, which may end the method 400.

Figure 13:
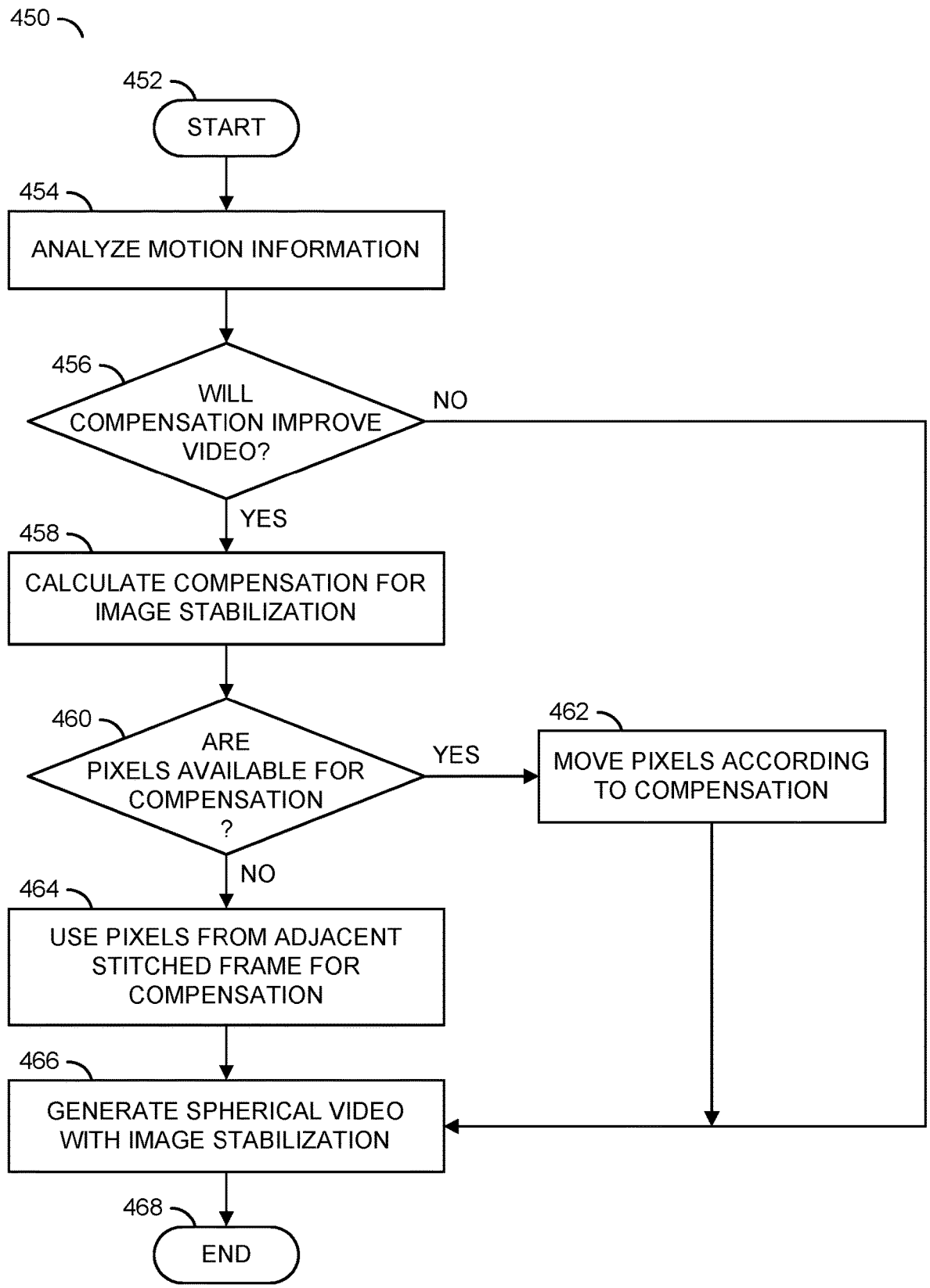
FIG. 13 is a flow diagram illustrating a method for compensating for motion using pixels from adjacent stitched video frames.

Referring to FIG. 13, a method (or process) 450 is shown. The method 450 may compensate for motion using pixels from adjacent stitched video frames. The method 450 generally comprises a step (or state) 452, a step (or state) 454, a decision step (or state) 456, a step (or state) 458, a decision step (or state) 460, a step (or state) 462, a step (or state) 464, a step (or state) 466, and a step (or state) 468.

The state 452 may start the method 450. In the state 454, the processor 100' may analyze the motion information (e.g., the signal STATUS and/or the digital motion estimation). Next, the method 450 may move to the decision state 456. In the decision state 456, the processor 100' may determine whether compensation will improve the video (e.g., whether there are negative effects to the video quality). If not, the method 450 may move to the state 466. If so, the method 456 may move to the state 458.

In the state 458, the processor 100' may calculate compensation for image stabilization. Next, the method 450 may move to the decision state 460. In the decision state 460, the processor 100' may determine whether there are pixels available for compensation (e.g., within the stitched video frames 200a-200n and/or within the extra margins captured by the sensors 82a-82n). If the processor 100' determines there are pixels available for compensation, the method 450 may move to the state 462. In the state 462, the processor 100' may move the pixels according the compensation calculated. Next, the method 450 may move to the state 466.

In the decision state 460, if the processor 100' determines there are not more pixels available for compensation, the method 450 may move to the state 464. In the state 464, the processor 100' may use pixels (e.g., the pixels 220i, 220j, 222i, 222j, 2241, 224j, etc.) from the adjacent stitched video frames (e.g., the stitched video frames 2021, 202j, 2041, 204j, etc.) for compensation. Next, the method 450 may move to the state 466. In the state 466, the processor 100' may generate spherical video frames with image stabilization 104a'-104n' (e.g., the signal VID360'). Next, the method 450 may move to the state 468, which may end the method 450.

In some embodiments, the processor 100 may be configured to perform the video stitching operations to generate the spherical video frames 104a-104n. The processor 100 may be configured to generate the image stabilization on a stitched result (e.g., the spherical video frames 104a-104n) regardless of whether the spherical video frames 104a-104n have been generated by the processor 100 or an external device (e.g., the video stitching device 120). The processor 100 may be configured to determine the image stabilization information based on motion information from the sensor 112 (e.g., gyroscope-based data) and/or digital motion estimation. The processor 100 may be configured to perform the image stabilization for the camera 52 irrespective of the number of capture devices 80a-80n. For example, the processor 100 may perform the image stabilization for the camera 52 implementing 2 cameras (e.g., the capture devices 80a-80b). In another example, the processor 100 may perform the image stabilization for the camera 52 implementing n cameras (e.g., the capture devices 80a-80n). Generally, the video stitching operations perform progressively better as the number of the capture devices 80a-80n increases.

The functions and structures illustrated in the diagrams of FIGS. 10 to 13 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICS (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to the preferred embodiments thereof, it will be understood by those skilled in the art that various changes in form and details may be made without departing from the scope of the invention.

The invention claimed is:
1. An apparatus comprising:
a plurality of capture devices each configured to generate a video signal in response to pixel data captured, wherein one of said capture devices generates vibration information in response to a movement of said capture devices detected while said pixel data is captured; and
a processor configured to (i) receive (A) said video signals from at least two of said capture devices and (B) said vibration information from at least one of said capture devices, (ii) process said pixel data in said video signals arranged as video frames, (iii) perform a video stitching operation on said video frames, (iv) generate a stitched video based on said video stitching operation and (v) calculate image stabilization data for said stitched video in response to (A) said stitched video and (B) said vibration information, wherein
  (a) said pixel data from one of said video signals is used by said processor to perform image stabilization for said video frames from another of said video signals based on said image stabilization data,
  (b) said vibration information is stored separately from said video signals and communicated with said stitched video,
  (c) said image stabilization occurs by rotating said stitched video after said video stitching operation in response to said image stabilization data, and
  (d) said stitched video and said image stabilization data are communicated to a playback device remotely located from said apparatus to enable said playback device to perform said image stabilization on said stitched video to compensate in real-time during playback of said stitched video for said movement of said capture devices that occurred before said playback.

2. The apparatus according to claim 1, wherein said stitched video comprises a spherical field of view.

3. The apparatus according to claim 1, wherein said processor is further configured to apply said image stabilization data to said stitched video to compensate for an amount of said movement of said apparatus.

4. The apparatus according to claim 1, wherein said image stabilization is applied by moving said pixel data into a stitched video frame from an adjacent stitched video frame in response to a direction of said movement of said apparatus.

5. The apparatus according to claim 1, wherein (i) said processor is further configured to package said image stabilization data as metadata and (ii) said metadata and said stitched video are presented to said playback device that is separate from said plurality of capture devices.

6. The apparatus according to claim 5, wherein said playback device is configured to (i) read said metadata and (ii) display said playback of said stitched video using said image stabilization data to compensate for said movement that occurred while capturing said pixel data.

7. The apparatus according to claim 5, wherein (i) said metadata is used as a first input to said playback device for said image stabilization and (ii) input from a user is received as a second input to said playback device for moving a view of said stitched video.

8. The apparatus according to claim 1, wherein said vibration information is received from a sensor device.

9. The apparatus according to claim 8, wherein said sensor device is a gyroscope configured to measure said movement of said capture devices.

10. The apparatus according to claim 1, wherein said processor is configured to perform said image stabilization in post-processing.

11. The apparatus according to claim 1, wherein said processor is implemented as part of a network of processors implemented to scale on demand.

12. The apparatus according to claim 1, wherein said apparatus implements said image stabilization for a multi-sensor camera.

13. The apparatus according to claim 1, wherein said image stabilization is configured to counteract a shaking of said capture devices by a content creator.

14. The apparatus according to claim 1, wherein said image stabilization is configured to counteract a rolling shutter effect caused by said capture devices.

15. The apparatus according to claim 1, wherein said image stabilization is configured to reduce an amount of motion artifacts in said stitched video.

16. The apparatus according to claim 1, wherein (i) said playback device is configured to (a) receive user input and (b) rotate said stitched video in response to said user input and (ii) said image stabilization data is added to said user input to provide said image stabilization.

17. The apparatus according to claim 1, wherein said processor is further configured to (i) query said playback device to determine whether said playback device supports said image stabilization data and (ii) communicate said image stabilization data with said stitched video if said playback device supports said image stabilization data.

18. The apparatus according to claim 1, wherein said playback device is configured to check said image stabilization data to generate a stabilized output of said stitched video on a per-frame basis.

19. The apparatus according to claim 1, wherein (i) said processor is further configured to perform encoding operations to encode said stitched video and (ii) said playback device is configured to perform compensation on said stitched video using said image stabilization data as a post-processing technique.

* * * * *